S. E. BAUDER.
Improvement in Churn Dashers.
No. 124,536. Patented March 12, 1872.
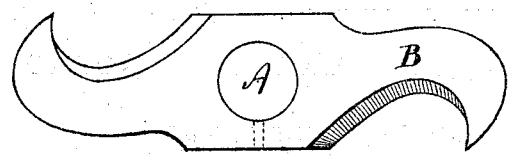
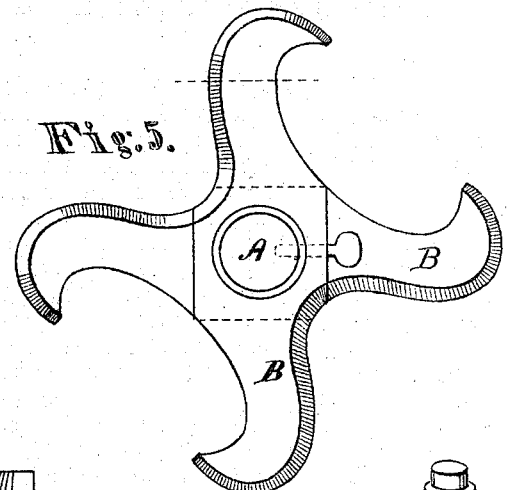
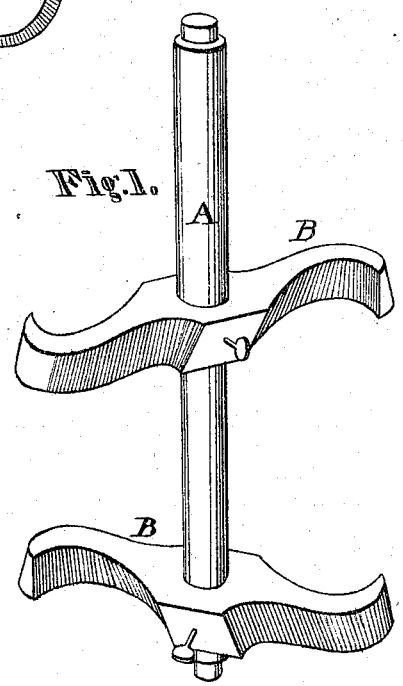
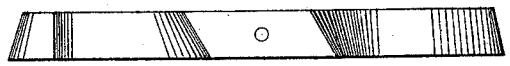

124,536

UNITED STATES PATENT OFFICE.

SILAS E. BAUDER, OF BIRMINGHAM, OHIO.

IMPROVEMENT IN CHURN-DASHERS.

Specification forming part of Letters Patent No. 124,536, dated March 12, 1872; antedated March 8, 1872.

*To all whom it may concern:*

Be it known that I, SILAS E. BAUDER, of Birmingham, in the county of Erie and State of Ohio, have invented a new and valuable Improvement in Churn-Dashers; and I do hereby declare that the following is a full, clear and exact description of the construction and operation of the same, reference being had to the annexed drawing making a part of this specification, and to the letters and figures of reference marked thereon.

Figure 1 of the drawing is a representation of my churn-dasher in perspective. Fig. 2 is a bottom view of the lower dash-bar. Fig. 3 is a bottom view of the upper dash-bar. Fig. 4 is an edge view of the lower bar. Fig. 5 is a top view of the churn-dasher. Fig. 6 is a cross-section of the upper dash-bar through the line $x\ x$.

My invention has relation to an improvement in rotating churn-dashers; and it consists in the construction and novel form of the cross-bars or beaters, whereby conflicting currents are created.

The letter A of the drawing designates the vertical shaft, upon which are keyed the adjustable cross-bars or beaters B B, placed one above the other on the shaft, and so arranged that the general direction of one bar is at right angles with that of the other. The cross-bars B B are peculiar in form. Each one is S-shaped; but the lower bar is arranged to face in the opposite direction from the upper bar. In their general form they are similar; but each one is provided with sloping or inclined sides, which, in consequence of their being turned in opposite directions, are conversely arranged. The principle of this arrangement is that, while the convex edges of each S-shaped dash-bar slope downward and outward, the concave edges thereof slope downward and inward. When the motion of the bar is such that its concave edges are in advance, the currents created are downward and divergent. If the convex edges are in advance, the currents are upward and convergent.

The arrangement preferred is to turn the upper bar in such a manner that the concave edges will be in the advance, while the lower bar faces in the opposite direction, and has its convex edges in the advance. The upper cream is in this manner designed to be carried downward, while the lower cream is brought upward by the currents created, and the conflict between the particles of cream in these opposing currents serves an important purpose in breaking the butter capsules.

Having thus fully described my invention, what I claim as new, and desire to secure by Letters Patent, is—

In a churn, the combination, with the shaft, of the adjustable S-shaped dash-bars B B, said bars being reversely placed on the stem, and having their convex edges inclined downward and outward and their concave edges inclined downward and inward, as specified.

In testimony that I claim the above I have hereunto subscribed my name in the presence of two witnesses.

SILAS E. BAUDER.

Witnesses:
WILLIAM B. HUTCHINSON,
ADAM H. CROUSE.